INVENTOR.
Thomas F. Hillman

June 13, 1967        T. F. HILLMAN        3,325,269

SPLIT MOLD OPERATING MECHANISM

Filed May 27, 1964        2 Sheets-Sheet 2

INVENTOR.
Thomas F. Hillman

BY *Clarence R. Patty, Jr.*
ATTORNEY

United States Patent Office 3,325,269
Patented June 13, 1967

3,325,269
SPLIT MOLD OPERATING MECHANISM
Thomas F. Hillman, Corning, N.Y., assignor to Corning Glass Works, Corning, N.Y., a corporation of New York
Filed May 27, 1964, Ser. No. 370,540
6 Claims. (Cl. 65—360)

This invention relates to glass forming machinery and particularly to a glass mold operating mechanism for opening and closing split molds employed in the blowing and forming of glass articles. Still more specifically the invention relates to a split glass mold operating mechanism especially adapted to be used on glass forming machinery of the type in which a succession of glass blanks or parisons suspended from a carrier are periodically and successively carried to a stationary blowing and forming location. In such glass forming machinery, each of the blanks or parisons temporarily dwell at said stationary location and are enclosed within a split glass mold for the blowing and forming of a glass article. Thereafter the mold is again operated to an open condition for removal of the formed article and the receipt of the next of the succession of parisons for forming thereof. The present invention relates to a novel type of mechanism for operating such a split mold between its open and closed positions.

Split glass mold operating mechanisms heretofore employed usually comprise relatively complex arrangements of links, rock arms, slides, hinge pins, etc. which are subject to considerable wear and which rapidly become out of adjustment. It is, therefore, an object of the present invention to provide a split mold operating mechanism in which no links, hinge pins, slides, etc. are used, and which is of sturdy construction, is subject to a minimum of wear and requires minimum adjustment.

It is another object of the invention to provide a mechanism for operating split molds between open and closed positions, and which is substantially direct acting and, therefore, employs few moving parts.

It is a third object of the invention to provide a split mold actuating mechanism embodying a relatively simple mode of operation.

In accomplishing the above objects of the invention each half or section of a split mold is supported upon a first end of a different one of a pair of vertical and concentrically arranged drive shafts, such shafts each having provided at their opposite ends a rack and pinion gear arrangement for simultaneous and partial rotation of the shafts in opposite directions relative to each other and, thereby, opening and closing of the split mold.

The invention will best be understood by reference to the accompanying drawings in which.

Figure 1:
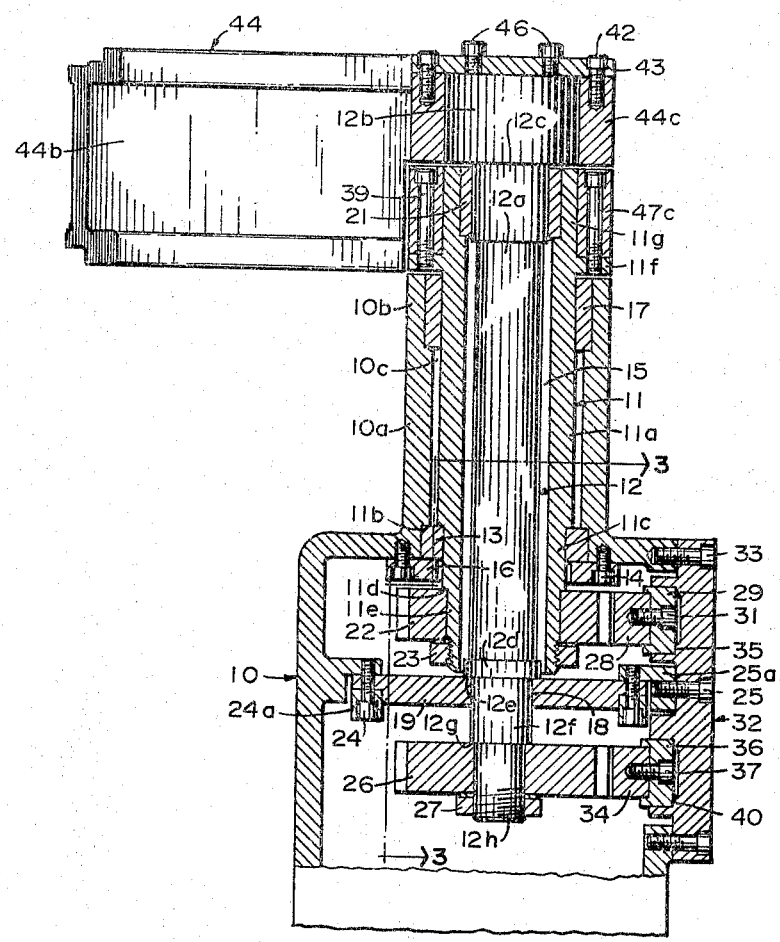
FIG. 1 is a side elevational view, partially sectional, of the mold operating mechanism according to the invention.
Figure 3:
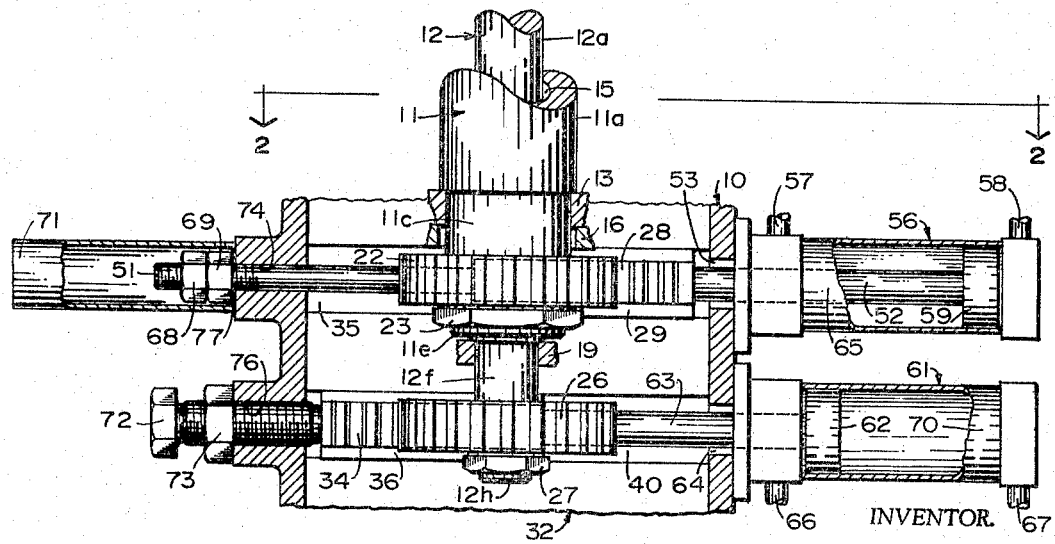

FIG. 3 comprises a front elevational view, partially sectional, of a portion of the mold operating mechanism and taken generally along the line 3—3 of FIG. 1.

Similar reference characters refer to similar parts in each of the drawings.

Referring to the drawings, in detail, there is shown in FIG. 1 a support member comprising a casing or housing 10 in which is vertically disposed a tubular first drive shaft 11 including a hollow 15 extending longitudinally therethrough. A cylindrical second drive shaft 12 is disposed in the hollow 15 in drive shaft 11 with its top and bottom ends extending beyond the ends of such shaft 11. It is, therefore, apparent that such shafts are concentrically disposed relative to each other.

Drive shaft 11 comprises a central portion 11a having a preselected outside diameter and provided, towards its lower end, with a shoulder 11b formed thereon by a lower portion 11c having a lesser outside diameter than portion 11a. Similarly, portion 11C is provided, towards its lower end, with a shoulder 11d formed thereon by a still lower portion 11e having a lesser outside diameter than portion 11c. Portion 11c of drive shaft 11 extends snugly but rotatively through a bushing 13 which is held in place in a recessed portion of housing 10 by an annular ring 16 secured to housing 10 by bolts such as 14, such bushing thereby providing a lower bearing for drive shaft 11 on and in which shoulder 11b and portion 11c of such shaft respectively rotate. A pinion 22 is closely fitted around portion 11e of shaft 11 and is drawn tightly and immovably up against shoulder 11d by a nut 23 internally threaded to cooperate with threads provided on the lower end of portion 11e of shaft 11. If considered necessary for purposes of assuring that pinion 22 is immovably affixed to shaft 11, a keyway and cooperating key can be provided on such parts.

Casing or housing 10 includes a first upper portion 10a which surrounds and encloses drive shaft 11, such portion having an inside diameter of a dimension greater than the outside dimension of shaft 11 and thereby providing a cavity 10c surrounding the major part of the central portion 11a of shaft 11. Housing 10 further includes an extreme upper portion 10b having an inside diameter greater than that of portion 10a of housing 10 and thereby forming a recess in which is provided a bushing 17 through which shaft 11 snugly but rotatively extends, such bushing thereby providing a upper bearing in which shaft 11 may rotate.

Drive shaft 11 has an extreme upper portion 11g which has an inside diameter greater than that of the remainder of shaft 11 thereby providing a recess therein in which is disposed a bushing 21 which acts as a bearing for drive shaft 12, as hereinafter discussed. Drive shaft 11 includes near its upper end an integrant flange portion 11f, such flange portion having an outside diameter substantially greater than the remainder of shaft 11 and to be used for a purpose hereinafter described.

Drive shaft 12 includes a central portion 12a, an extreme upper portion 12b having an outside diameter substantially greater than that of portion 12a of the shaft, and an intermediate oprtion 12c whose outside diameter is intermediate that of portions 12a and 12b of shaft 12. Portion 12c of shaft 12 fits closely but rotatively within the bushing 21, previously discussed, and such bushing thereby forms an upper bearing for shaft 12 in which such shaft can freely rotate. The purpose of portion 12b of shaft 12 will be discussed hereinafter.

Shaft 12 includes near its lower end a shoulder 12e formed by a portion 12d having a larger outside diameter than that of portion 12a of shaft 12. Similarly, a shoulder 12g is included on shaft 12 and is formed by an extreme lower portion 12h such portion having a smaller outside diameter than that of portion 12f of shaft 12. Portion 12f of shaft 12 fits snugly but rotatively through a hole 18 provided in a plate 19 secured within the interior of housing 10 by bolts such as 24 and 25, and supporting pieces such as 24a and 25a. Bolts such as 25 extend through a back plate 32, which is connected to casing or housing 10 by bolts, such as 33, and supports supporting piece 25a within the housing 10. Hole 18 in plate 19 and the upper surface of plate 19 provide bearing surfaces in and on which portion 12f and shoulder 12e of shaft 12 may respectively rotate.

A pinion 26 is closely fitted over portion 12h of shaft 12 and is drawn tightly and immovably up against shoulder 12g by a threaded nut 27 screwed onto cooperating threads provided on the extreme lower end of portion 12h of shaft 12. Similar to pinion 22 provided on shaft 11, if considered necessary to assure that pinion 26 is immovably mounted on shaft 12, a cooperating key and keyway may be provided on such parts.

A first rack 28 meshes with pinion 22 and is connected to a slide 29 by bolts such as 31, the slide 29 being disposed in a slideway 35 provided in back plate 32. A second rack 34 meshes with pinion 26 and is connected to a slide 36 by bolts such as 37. Slide 36 is disposed in a slideway 40 provided in back plate 32. As illustrated in FIG. 3, the piston rod 52 of a first fluid actuated piston motor 56 extends through a hole 53 provided in housing 10, the piston motor 56 being affixed to housing 10 as, for example, by welding. The piston rod 52 has a piston 59 on one end thereof and disposed within the cylinder 65 of motor 56, the other end of the rod being connected to rack 28 for actuation thereof as discussed hereinafter. Such connection of rod 52 to rack 28 may be made, for example, by drilling and tapping a hole in the end of the rack and providing cooperating threads on the end of rod 52. Rack 34 is similarly connected to the first end of a piston rod 63 of a second fluid actuated piston motor 61, also affixed to housing 10 as by welding, for example. The rod 63 extends through a hole 64 provided in the housing 10 and has a piston 62 provided thereon and disposed within the cylinder 70 of the piston motor 61. Fluid such as air under pressure is supplied to and exhausted from motor 56 through conduits such as 57 and 58. Similarly, actuating fluid is supplied to and exhausted from motor 61 through conduits such as 66 and 67. Valves and associated systems for controlling the flow of fluid to and from the motors 56 and 61 for actuation thereof are well known in the art and are not shown in the drawings since such apparatus per se forms no part of the present invention. It is pointed out, however, that actuating fluid for actuation of the motors is to be supplied simultaneously over conduits 57 and 67 of motors 56 and 61, respectively, or simultaneously over conduits 58 and 66 of motors 56 and 61, respectively. This will be further discussed hereinafter in this description.

A rod 51 is connected to the end of rack 28 opposite that to which piston rod 52 is connected, such connection being made, for example, by drilling and tapping such end of the rack and providing cooperating threads on a first end of the rod 51. The other end of rod 51 extends through a closely fitting hole 74 provided in housing 10, the rod being free to longitudinally move within such hole. Such other end of rod 51 is also threaded and is provided with first and second nuts 68 and 69 which are locked against each other on rod 51. As indicated at 77 a small space is provided between nut 69 and housing 10, the rod 51 and its associated nuts 68 and 69 being provided only to prevent overrun of rack 28 when moving to the position illustrated in FIG. 3. A protective housing or cylinder 71 is provided over the end of rod 51 and its associated nuts 68 and 69, such cylinder being attached to housing 10 as by welding, for example.

An adjustable rack stop in the form of a bolt 72 having a locknut 73 is screwed through a threaded hole 76 provided in housing 10 at such a position as to be contacted by the end of rack 34 when such rack moves to its position illustrated in FIG. 3.

As illustrated in FIG. 1 a first mold arm 44 having a mold carrier portion 44b and a mounting portion 44c, including a top plate 43 attached to portion 44c by bolts such as 42, fits over and is secured to portion 12b of shaft 12 by bolts such as 46. A second mold arm such as 47 illustrated in FIG. 2 has a mounting portion 47c (FIG. 1) which fits over portion 11g of drive shaft 11 and is secured to the integrant flange portion 11f of such shaft by bolts such as 39. The mold carrier portion 47b (FIG. 2) of mold arm 47 does not appear in FIG. 1 since such drawing figure is a partially sectional view taken as on line 1—1 of FIG. 2.

Figure 2:
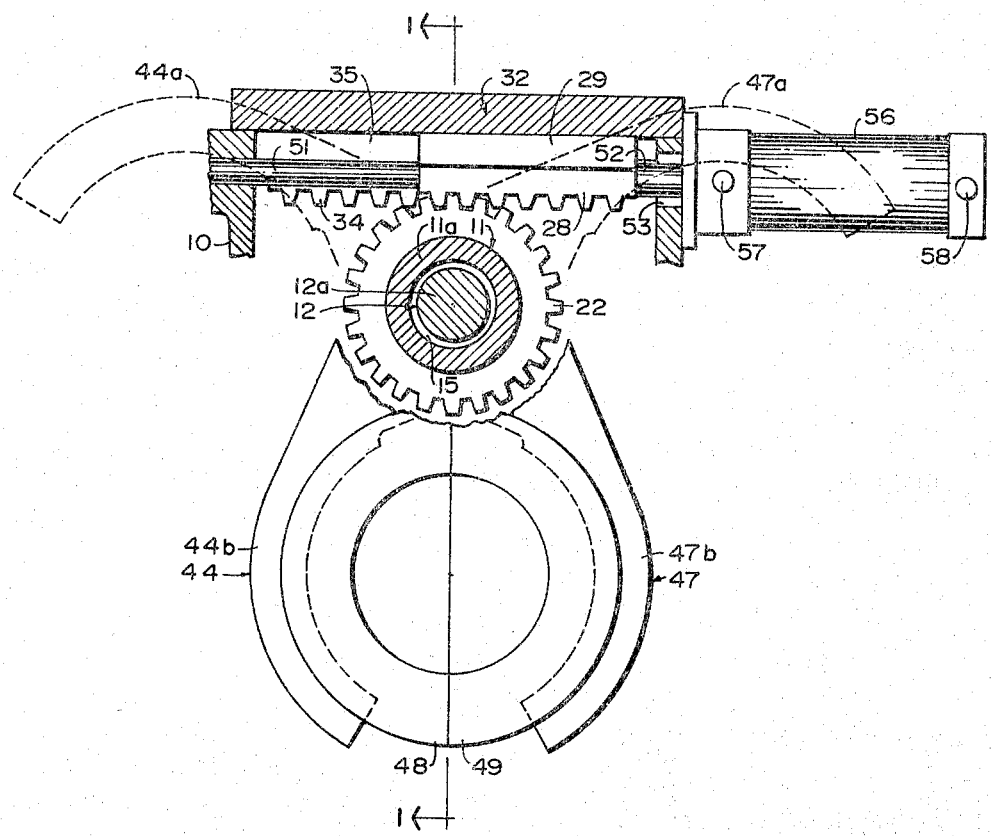
FIG. 2 is a schematic and partial plan view of the mechanism taken generally along the line 2—2 of FIG. 3 and illustrating the mold sections and associated mold arms or carriers in their closed positions, and the mold arms themselves in their opened positions.

As illustrated in FIG. 2, mold arms 44 and 47 carry split mold halves or sections 48 and 49, respectively, such mold sections being secured to their respective mold arms by any of the means well known in the art. The closed condition of mold arms 44 and 47 and their associated mold halves 48 and 49 are illustrated in FIG. 2 by solid lines. The mold arms 44 and 47 when in their open positions are illustrated in FIG. 2 by the dotted lines indicated at 44a and 47a, respectively.

As will be readily understood by reference to FIG. 3 of the drawings, when pressurized fluid is supplied to conduits 57 and 67 on fluid motors 56 and 61, respectively, and conduits 58 and 66 on such motors are opened to exhaust, racks 28 and 34 are actuated to their respective positions shown, thereby closing the split mold as illustrated in FIG. 2. It will be noted that at such time a greater piston area is presented to the actuating fluid supplied to cylinder 70 of motor 61 than is presented to the actuating fluid supplied to cylinder 65 of motor 56 and, therefore, the exact final position of both of the mold halves 48 and 49 when in their closed conditions is determined by the point of adjustment of adjustable stop 72 which limits the movement of rack 34 actuated by piston 62 of motor 61.

When pressurized fluid is supplied to conduits 58 and 66 on fluid motors 56 and 61, respectively, and conduits 57 and 67 are opened to exhaust, the mold arms 44 and 47 are actuated to their open positions illustrated by the dotted line outlines of such arms indicated at 44a and 47a in FIG. 2.

From the foregoing description and the accompanying drawings it will be apparent that there is disclosed herein a simplified form of a split mold operating mechanism which is relatively direct acting, employs a minmum of moving parts and which may be rapidly and easily adjusted to compensate for wear.

Although there is herein shown and described only one form of mechanism embodying the invention, it will be understood that various changes and modifications may be made therein without departing from the spirit and scope of the appended claims.

What is claimed is:

1. A split mold operating mechanism comprising, in combination, a pair of concentrically and vertically disposed drive shafts supported for separate rotation about their common axis the ends of the inner one of said shafts extending beyond the ends of the outer one, a mold arm affixed to each of corresponding first ends of said shafts, a split mold including first and second cooperating mold sections carried by said mold arms, a pinion affixed to each of the ends of said shafts opposite said first ends, a rack meshing with each of said pinions, and a motor connected to reciprocate each said rack.

2. A split mold operating mechanism in accordance with claim 1 wherein said motors comprise fluid actuated piston motors.

3 A split mold operating mechanism in accordance with claim 1 wherein said motors comprise identical first and second fluid actuated piston motors adapted to provide different piston areas for the actuation of the mold sections to the closed condition of the split mold, and further including an adjustable rack stop adapted to limit the stroke of movement of the rack actuated by the larger piston area during actuation of the split mold to its closed condition.

4. A split mold operating mechanism comprising, in combination, a first vertically disposed and tubular drive shaft, a second cylindrical drive shaft extending through the hollow in said first drive shaft and beyond the ends thereof such shafts supported for separate rotation about a common axis, a pinion on each of adjacent first ends of said shafts, a rack meshing with each of said pinions, a mold carrier affixed to and extending radially outward from each of adjacent second ends of said shafts and adapted to carry first and second split mold halves between an open condition and a mutually cooperative closed condition of such mold halves, and a motor connected to each said rack to impart reciprocating motion thereto.

5. A split mold operating mechanism in accordance with claim 4 wherein said motors comprise fluid actuated piston motors.

6. A split mold operating mechanism in accordance with claim 4 wherein said motors comprise identical first and second fluid actuated piston motors adapted to provide different piston areas for the actuation of the mold sections to the closed condition of the split mold, and further including an adjustable rack stop adapted to limit the stroke of movement of the rack actuated by the larger piston area during actuation of the split mold to its closed condition.

References Cited
UNITED STATES PATENTS

| | | | |
|---|---|---|---|
| 1,272,971 | 7/1918 | Lewis | 65—357 |
| 1,322,726 | 11/1919 | Owens | 65—360 X |
| 1,745,794 | 2/1930 | Hatch | 65—360 X |
| 2,137,714 | 11/1938 | Dorman | 65—360 |
| 3,251,673 | 5/1966 | Brymer | 65—361 X |

DONALL H. SYLVESTER, *Primary Examiner.*

A. D. KELLOGG, *Assistant Examiner.*